US010475029B2

(12) United States Patent
Acuña-Rohter

(10) Patent No.: US 10,475,029 B2
(45) Date of Patent: Nov. 12, 2019

(54) SYSTEM AND METHOD FOR CONSUMER FRAUD PROTECTION

(71) Applicant: ALLOWIFY LLC, Chicago, IL (US)

(72) Inventor: José Antonio Acuña-Rohter, Chicago, IL (US)

(73) Assignee: Allowify LLC, Des Plaines, IL (US)

(*) Notice: Subject to any disclaimer, the term of this patent is extended or adjusted under 35 U.S.C. 154(b) by 118 days.

(21) Appl. No.: 13/834,798

(22) Filed: Mar. 15, 2013

(65) Prior Publication Data
US 2014/0279518 A1 Sep. 18, 2014

(51) Int. Cl.
G06Q 40/00 (2012.01)
G06Q 20/40 (2012.01)
G06Q 30/00 (2012.01)
G06Q 30/06 (2012.01)

(52) U.S. Cl.
CPC ......... *G06Q 20/40* (2013.01); *G06Q 20/4016* (2013.01); *G06Q 30/0185* (2013.01); *G06Q 30/06* (2013.01)

(58) Field of Classification Search
CPC .................................................... G06Q 30/02
USPC ........................................... 705/35-44, 36 R
See application file for complete search history.

(56) References Cited

U.S. PATENT DOCUMENTS

| 6,021,397 | A  | * | 2/2000  | Jones et al. ............ 705/36 R |
| 7,039,221 | B1 |   | 5/2006  | Tumey |
| 7,389,913 | B2 |   | 6/2008  | Starrs |
| 7,752,135 | B2 |   | 7/2010  | Brown et al. |
| 7,793,835 | B1 |   | 9/2010  | Coggeshall et al. |
| 8,386,353 | B2 |   | 2/2013  | Hirson et al. |
| 8,831,677 | B2 |   | 9/2014  | Villa-Real |
| 8,856,894 | B1 |   | 10/2014 | Dean |
| 2001/0042785 | A1 | * | 11/2001 | Walker et al. ............ 235/379 |
| 2002/0123971 | A1 |   | 9/2002  | Maritzen |
| 2004/0117302 | A1 | * | 6/2004  | Weichert et al. ............ 705/40 |
| 2008/0140576 | A1 |   | 6/2008  | Lewis et al. |
| 2009/0094669 | A1 |   | 4/2009  | Savadi et al. |
| 2011/0208601 | A1 |   | 8/2011  | Ferguson et al. |
| 2012/0030116 | A1 |   | 2/2012  | Shirey et al. |
| 2012/0143722 | A1 |   | 6/2012  | John |
| 2012/0196568 | A1 |   | 8/2012  | Bakshi |
| 2012/0253957 | A1 |   | 10/2012 | Bakshi |
| 2012/0330840 | A1 | * | 12/2012 | Stinchcombe ............ 705/44 |

(Continued)

FOREIGN PATENT DOCUMENTS

| WO | 00135301   | 5/2001 |
| WO | 2013188062 | 12/2013 |

OTHER PUBLICATIONS

"Credit Card Fraud Statistics", Statistic Brain, available at www.statisticbrain.com/credit-card-fraud-statistics/ (Accessed Mar. 4, 2013).

(Continued)

Primary Examiner — Hani M Kazimi
(74) Attorney, Agent, or Firm — Barich IP Law Group

(57) ABSTRACT

The present invention relates to system and method for authorizing a financial transaction using user-data collected from third party websites, such as Social Media Networks. In operation, collected user-data may be compared to a financial-data collected during a financial transaction to identify potential fraud and/or other discrepancies, confirming the identity of the user with a greater degree of accuracy.

2 Claims, 7 Drawing Sheets

(56) References Cited

U.S. PATENT DOCUMENTS

| | | | |
|---|---|---|---|
| 2013/0030934 A1 | 1/2013 | Bakshi et al. | |
| 2013/0046692 A1 | 2/2013 | Grigg et al. | |
| 2013/0054340 A1* | 2/2013 | Lehman | 705/14.27 |
| 2013/0054469 A1 | 2/2013 | Agashe et al. | |
| 2013/0060701 A1 | 3/2013 | Moon et al. | |
| 2013/0066763 A1 | 3/2013 | Baker et al. | |
| 2013/0067547 A1 | 3/2013 | Thavasi et al. | |
| 2013/0090998 A1 | 4/2013 | Shimogori | |
| 2013/0275222 A1 | 10/2013 | Amaro et al. | |
| 2013/0275308 A1 | 10/2013 | Paraskeva et al. | |
| 2014/0101052 A1 | 4/2014 | Song et al. | |
| 2014/0201077 A1 | 7/2014 | Cama et al. | |
| 2014/0250009 A1 | 9/2014 | Carlson | |
| 2014/0258136 A1 | 9/2014 | Ellis | |
| 2014/0282870 A1 | 9/2014 | Markwordt et al. | |
| 2014/0337217 A1 | 11/2014 | Howe et al. | |
| 2015/0020162 A1 | 1/2015 | Hefetz | |
| 2015/0026025 A1 | 1/2015 | Calman et al. | |
| 2015/0073987 A1 | 3/2015 | Dutt | |
| 2015/0081557 A1 | 3/2015 | Kinfoil et al. | |

OTHER PUBLICATIONS

Carr, Austin, "Foursquare Syncs with MasterCard, Visa for Merchant Specials," Fast Company, Feb. 25, 2013, available at www.fastcompany.com/3006257/foursquare-syncs-mastercard-visa-merchant-specials (Accessed Mar. 13, 2013).

Visa says new app will cut credit-card travel troubles, Feb. 13, 2015, Retrieved on Apr. 21, 2015 from: http://www.cnet.com/news/visa-says-new-app-will-cut-credit-card-travel-troubles/.

Visa Launches Mobile Location Service to Improve Card Payment Experience When Traveling, Feb. 12, 2015, Retrieved on Apr. 21, 2015 from: http://visatechmatters.tumblr.com/post/110826248690/visa-launches-mobile-location-service-to-improve.

Leveraging Cellular Infrastructure to Improve Fraud Prevention, 2009, Park et al. paper, Georgia Institute of Technology, Retrieved on Apr. 21, 2015 from: http://www.cc.gatech.edu/~traynor/papers/acsac09.pdf.

IPRP and Written Opinion, dated Sep. 24, 2015, PCT/US2014/030154.

International Search Report, dated Sep. 12, 2014, PCT/US2014/030154.

* cited by examiner

SYSTEM AND METHOD FOR CONSUMER FRAUD PROTECTION

TECHNICAL FIELD

The present invention relates to systems and methods for consumer fraud protection. More specifically, the present invention relates to a system and method for authorizing a financial transaction using third-party data.

BACKGROUND

Credit card fraud is a crime that has affected about ten percent of the American population, with a median fraudulent transaction value of 399 U.S. dollars. Globally, the total amount of transactions involved in credit card fraud adds up to about 5.5 billion U.S. dollars in 2012. The majority of credit card fraud is perpetrated by either using counterfeit cards (about 37%) and or lost/stolen cards (about 23%), which often occur at a point of sale.

Existing technology attempts to alleviate the problem of correctly authorizing financial transactions by using computationally complex heuristics and expensive computer systems to determine if a transaction matches the profile or behavior of the authorized end-user. However, heuristics are complex, computationally expensive, data intensive, relatively slow algorithms and have success rates of varying degrees. Specifically, current heuristics and computational power fail to meet the needs of consumers because of, but not limited to, the following reasons: (a) end-users are incorrectly flagged as having made an unauthorized transaction; (b) fraudulent transactions are not flagged as having made an unauthorized transaction; (c) analysis of transactions is done asynchronously out of band so transactions are allowed to complete before fraud is detected; and (d) they don't have access to a user's real-time data.

Despite the prior attempts to improve financial transaction fraud protection, a need exists for a system and method for financial authorization (e.g., Credit Card transactions) based on third party data, such as social media data, to reduce the reliance on ineffective fraud detection heuristics and expensive computing power.

SUMMARY OF THE INVENTION

The present disclosure is directed to a system and method for credit card transaction authorization based on social media data.

According to a first aspect of the present invention, disclosed is a process for authorizing a financial transaction comprising the steps of: receiving transaction-data related to said financial transaction from a financial institution over a communication network; receiving user-data from a third-party information source; and comparing said transaction-data to said user-data to authorize or deny said financial transaction.

In another aspect of the present invention, said user-data is selected from a list of approved merchants, a shared Location, a user behavior, or a calendar event. In some embodiments, said third-party information source is a Social Media Network.

The financial transaction may be related to a financial account at said financial institution that is linked to a user account at said third-party information source by a user.

In order to facilitate said financial transaction, said financial institution is authorized to retrieve said user-data prior to authorizing said financial transaction.

In some aspects, if said financial-data comprises a transaction Location, said financial transaction is authorized if said transaction Location is within a predetermined distance of said user-data. In another aspect, if said financial-data comprises a merchant name, said financial transaction is authorized if said merchant name is contained in said user-data.

If said financial-data comprises a transaction category type, said financial transaction may be authorized if said transaction category type is contained in said user-data. In some aspects, if said user-data comprises a list of approved behavior types, said financial transaction is authorized if said approved behavior type matches a behavior type contained in said financial-data.

In another aspect, if said user-data comprises a list of prohibited behavior types, said financial transaction is denied if said prohibited behavior type matches a behavior type contained in said financial-data. In a further aspect, if said user-data comprises a user Location and said financial-data comprises a merchant Location, said financial transaction is authorized if said user Location is within a predetermined distance of said merchant Location.

In some aspects, said user-data comprises a transaction category related to a calendar event. In this circumstance, said financial transaction is authorized if said transaction category is contained in said financial-data and a date of said financial transaction is within a predetermined date range of a date of said calendar event.

In another aspect, said financial-data comprises a transaction merchant name and said user-data comprises a list of blocked merchant names. Said financial transaction is denied if said transaction merchant name is contained in said list of blocked merchant names.

In some aspects, if said financial transaction is denied, a heuristic module or a miscellaneous module may be utilized to authorize or deny said financial transaction.

According to a second aspect of the present invention, provided is a transaction authentication system for managing financial transactions, said transaction authentication system comprising: a data storage device storing a database linking at least one financial account at a financial institution with at least one third-party information source; and at least one processor, operatively coupled to the data storage device, wherein, when financial-data related to a financial transaction for the at least one financial account is received at said transaction authentication system, said at least one processor (a) retrieves user-data from said third-party information source and (b) compares said financial-data to said user-data to authorize or deny said financial transaction. The transaction authentication system may be located at said financial institution or elsewhere.

In some aspects, a linking module is provided that allows a user to link said at least one financial account to said at least one third-party information source. The linking module can also be used to allow a user to link a second financial account to said at least one third-party information source and store said link in said database.

DESCRIPTION OF THE DRAWINGS

These and other advantages of the present invention will be readily understood with reference to the following specifications and attached drawings wherein.

DETAILED DESCRIPTION

Figure 1:
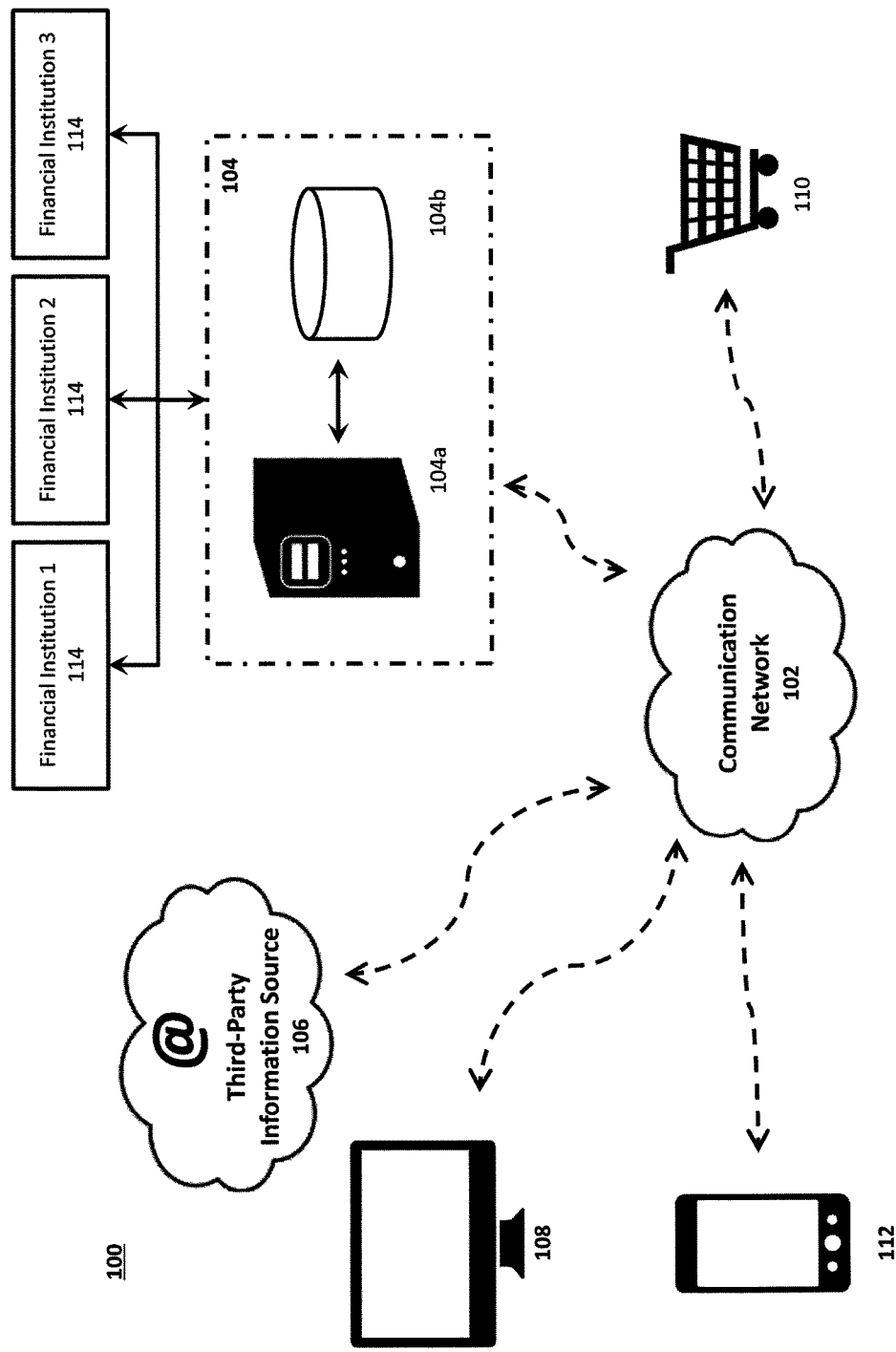
FIG. 1 is a block diagram illustrating an example of Social Media Fraud Protection System 100 for authorizing a financial transaction using third-party data.

Preferred embodiments of the present invention will be described herein below with reference to the accompanying drawings. In the following description, well-known functions or constructions are not described in detail because they may obscure the invention with unnecessary detail. The present invention relates to a system and method for authorizing a financial transaction using third-party data. For this disclosure, the following terms and definitions shall apply:

The terms "communicate" and "communicating" as used herein to include both conveying data from a source to a destination and delivering data to a communications medium, system, channel, network, device, wire, cable, fiber, circuit and/or link to be conveyed to a destination. The term "communication" as used herein means data so conveyed or delivered. The term "communications" as used herein includes one or more of a communications medium, system, channel, network, device, wire, cable, fiber, circuit and link.

The terms "coupled," "coupled to" and "coupled with" as used herein each mean a relationship between or among two or more devices, apparatuses, files, circuits, elements, functions, operations, processes, programs, media, components, networks, systems, subsystems and/or means, constituting any one or more of (a) a connection, whether direct or through one or more other devices, apparatuses, files, circuits, elements, functions, operations, processes, programs, media, components, networks, systems, subsystems or means, (b) a communications relationship, whether direct or through one or more other devices, apparatuses, files, circuits, elements, functions, operations, processes, programs, media, components, networks, systems, subsystems or means, and/or (c) a functional relationship in which the operation of any one or more devices, apparatuses, files, circuits, elements, functions, operations, processes, programs, media, components, networks, systems, subsystems or means depends, in whole or in part, on the operation of any one or more others thereof.

The term "data" as used herein means any indicia, signals, marks, symbols, domains, symbol sets, representations and any other physical form or forms representing information, whether permanent or temporary, whether visible, audible, acoustic, electric, magnetic, electromagnetic or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report or a list or in any other form.

The term "network" as used herein includes both networks and inter-networks of all kinds, including the Internet, and is not limited to any particular network or inter-network.

The term "processor" as used herein means processing devices, apparatuses, programs, circuits, components, systems and subsystems, whether implemented in hardware, tangibly embodied software or both, and whether or not programmable. The term "processor" as used herein includes, but is not limited to, one or more computing devices, hardwired circuits, signal modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities and combinations of any of the foregoing.

The term "computer" as used herein means a device, or collection of devices, having a processor and enabled to perform one or more prescribed mathematical and/or logical operations.

The term "point-of-sale system" as used herein refers to a computerized system for managing and storing data related to a sale and/or transaction.

The term "Social Media Network" refers to a network, application or website that facilitates interaction among people, corporations and other entities in which they create, share and/or exchange information in virtual communities or networks. Example Social Media Networks include, but are not limited to, Facebook®, MySpace®, Google+®, Twitter®, and Foursquare®.

The term "Credit Card" refers to a payment card or other device issued to users, which facilitate financial transactions including, but not limited to, debit, credit, Radio-frequency identification (RFID) devices, and other charge operations.

The term "Location" refers to any geographical, physical or virtual Location. For example, the Location of a user may be a virtual Location (e.g., Amazon.com) or their physical Location (e.g., country, state, city, address, etc.).

The term "Merchant" refers to any entity or person engaged in the sale of commodities, products and/or services. Example Merchants include, but are not limited to, physical brick and mortar stores, virtual websites, networks or applications that facilitate online shopping (e.g., Amazon®), and online payment systems (e.g., PayPal®).

The term "Check-In" refers to an action by an end-user on a Social Media Network that creates or otherwise provides data related the end-user's present and/or historical Location and activities. For example, when a user Checks-In, the Social Media Network may be configured to provide the Location, type of Location, date/time of the Check-In, guests of the end-user and any other available information.

The term "Like" refers to an action by an end-user on a Social Media Network that flags or otherwise identifies a certain Merchant, product, or Location as being favored by the end-user. Conversely, if an end-user does not favor a merchant, the end-user may "Dislike" the Merchant.

The term "event calendar" refers to a digital calendar that creates or otherwise provides data related the end-user's past, present and/or future events. The event calendar may be further configured to provide any Location data associated with said past, present and/or future events.

During a financial transaction, it is important to confirm the identity of an end-user prior to completion of the transaction. Accordingly, to reduce the risk of fraud, data collected during a financial transaction should be compared to trusted data, such data collected from the end-user or other trusted data sources. Other trusted data sources may include, for example, one or more data sources that are authorized by the end-user to provide data about the end-user. Such data may be queried from another person's Social Media Network profile. For example, an authorized family member may "Check-In" on behalf of the end-user. Similarly, list of trusted Social Media Network connections (e.g., a "Facebook friend") may be authorized to Check-In the end-user, thereby generating trusted data.

However, using existing methods, available trusted data is generally limited and/or static. Thus, this limited and/or static trusted data does not necessarily provide an accurate indication of the user's recent Location, present Location, future Location, preferred merchants, or anticipated spending habits. Similarly, the amount and type of data collected during an average transaction with a Merchant is generally limited to information about the Merchant's Location, category of services and the value of the transaction (e.g., the amount of money exchanged). Accordingly, to augment fraud detection, it is advantageous to collect user-data in real-time from third-party sources. The collected real-time user-data may be used to confirm the credentials or other identifying qualities of the end-user with a greater degree of accuracy.

Without a doubt, over the past decade, Social Media Networks have become increasingly popular as they enable a user to communicate, monitor friends and meet new people within a network. With the explosion of portable electronic devices, such as smartphones, tablets and laptop computers, end-users generate an increasing amount of user-data on a daily- and even real-time basis. Moreover, such user-data is typically dynamic and generally includes information about the user, such as their present Location, future Location, past Location, daily activities, plans, events, interests, likes, Dislikes, etc. Indeed, user-data is often made available over the Internet to the end-user and other users in a particular network (e.g., a predetermined group of users) through third-party websites or applications, such as Social Media Networks or applications.

Thus, while Social Media Networks serve a primary purpose of enabling social communication between users, user-data generated and/or collected by Social Media Networks may be used to authenticate an end-user, or group of users, during a financial transaction. Accordingly, user-data may be retrieved from a third-party network and used during a financial transaction's user authentication process. For example, an end-user may link one or more financial accounts (e.g., Credit Cards) with one or more third-party networks (e.g., Social Media Networks) to facilitate communication of user data therebetween. Once communication is established, a financial institution responsible for the one or more financial accounts may dynamically retrieve available user-data from a Social Media Network and employ the user-data in the financial institution's fraud detection algorithm.

Consequently, the financial institution may compare collected user-data to any transaction-data collected during a financial transaction to identify potential fraud and/or other discrepancies. For example if a transaction is initiated in Chicago using a Credit Card, but the end-user associated with the Credit Card resides in San Francisco, the financial institution may query one or more Social Media Networks to determine whether the user may be on vacation in Chicago. User-data related to a user's present Location, which is often available through Social Media Networks, includes without limitation: Check-Ins, login Location, posting-Location, event Location from a calendar, etc.

To improve accuracy, a fraud protection system need not be confined to a single third-party network, but may be used with a plurality of authorized third-party networks, including, for example, Social Media Networks, common interest forums and/or e-mail domains (e.g., Gmail.com, Yahoo.com), where the Location may be determined using an IP address or any global positioning system ("GPS") coordinates/cell tower location associated with a portable device.

As will be discussed below, financial institutions may use user-data collected via third-party networks as an input to a fraud protection system. Thereby reducing, or even eliminating the heuristics needed to predict information about a user, thereby saving computing power, increasing fraud detection accuracy, and decreasing fraud detection system complexity. Accordingly, rather than relying on static data, a financial institution may request user-data from a third party network. More specifically, a process for authorizing a financial transaction may comprise the steps of: receiving transaction-data related to said financial transaction from a financial institution over a communication network; receiving user-data (e.g., approved merchants, a shared location, a user behavior, or a calendar event) from a third party information source (e.g., a Social Media Network); and comparing said transaction-data to said user-data to authorize or deny said financial transaction based on matches or mismatches. The financial transaction may be related to a financial account, which may be linked to a user account at said third party information source by a user, at said financial institution. To facilitate user-data retrieval, the financial institution may be authorized to retrieve said user-data prior to authorizing said financial transaction.

The present invention may be illustrated by the following example. This example is provided to aid in the understanding of the invention and is not to be construed as a limitation thereof.

FIG. 1 illustrates an example Social Media Fraud Protection System 100 for authorizing a financial transaction using third-party data. As illustrated, the Social Media Fraud Protection System 100 may comprise a Communication Network 102 (e.g., the Internet) that is communicatively coupled with, for example, a Transaction Authorization System 104, Third-Party Information Source 106, Point-of-Sale System (POS System) 110, and one or more user interface terminals, such as a Computer Terminal 108 and/or Portable Terminal 112.

While the Communication Network 102 is illustrated as a single network, one of skill in the art would recognize that one or more communication networks may be used to facilitate communication between the various components of the Social Media Fraud Protection System 100. Indeed, an encrypted communication channel, such as Secure Sockets Layer (SSL), may be employed to communicate data between, for example, the POS System 110 and the Transaction Authorization System 104.

The POS System 110 may be operated by a Merchant and used to process transactions between an end-user and the Merchant, whether physically (e.g., via brick and mortar store) or virtually (e.g., online shopping). For example, the POS System 110 may be a physical Credit Card processing machine or online Credit Card processing system, such as PayPal® or authorize.net.

The Third-Party Information Source 106 represents one or more third-party websites, networks, applications and/or databases, such as Social Media Networks, or a data feed therefrom (e.g., Facebook's® Newsfeed). The Third-Party Information Source 106 may be configured to communicate user-data associated with an end-user from the end-user's one or more third-party websites to the Transaction Authorization System 104.

Transaction Authorization System 104 facilitates fraud detection functionality for the Social Media Fraud Protection System 100. The Transaction Authorization System 104 generally comprises a computer 104a or datacenter of computers configured to perform one or more fraud detection algorithms/protocols and a database 104b or cluster of databases for storing, among other things, trusted data. Indeed, the computer may be communicatively coupled with a non-transitory computer-readable medium having computer-executable instructions embodied thereon. The computer-executable instructions, when executed by the computer, facilitate authentication using one or more bits of user-data retrieved from a third-party information source, such as Third-Party Information Source 106. The database 104b may be further configured to store user-data received from the Third-Party Information Source 106 and/or transaction-data collected during a transaction. In operation, the Transaction Authorization System 104 may use trusted data and/or user-data to authenticate the end-user and to determine if a transaction is valid, potentially fraudulent, or fraudulent. Generally speaking, the Transaction Authorization System 104 acts as a protective barrier between the POS System 110 and the end-user's financial institution 114.

As illustrated, one or more financial institutions 114 may be coupled with the Transaction Authorization System 104. Accordingly, in certain embodiments, a single Transaction Authorization System 104 may be coupled with two or more financial institutions 114. Alternatively, each financial institution 114 may be coupled with a single Transaction Authorization System 104. Moreover, the Transaction Authorization System 104 may by hosted, operated and/or facilitated by a third party or the financial institution 114.

The Social Media Fraud Protection System 100 may further include one or more end-user terminals, such as a Computer Terminal 108 and/or Portable Terminal 110. The end-user may use one or more user terminals to access the POS System 110. For example, the end-user may access the POS System 110 through an online retailer's website. Similarly, the end-user may access one or more third-party information sources, such as Social Media Networks. The one or more end-user terminals may also be used to facilitate communication between the Transaction Authorization System 104 and the end-user. For example, the Transaction Authorization System 104 may notify the end-user of any peculiar or blocked transactions through, for example, e-mail, text, automated call, etc.

Figure 2:
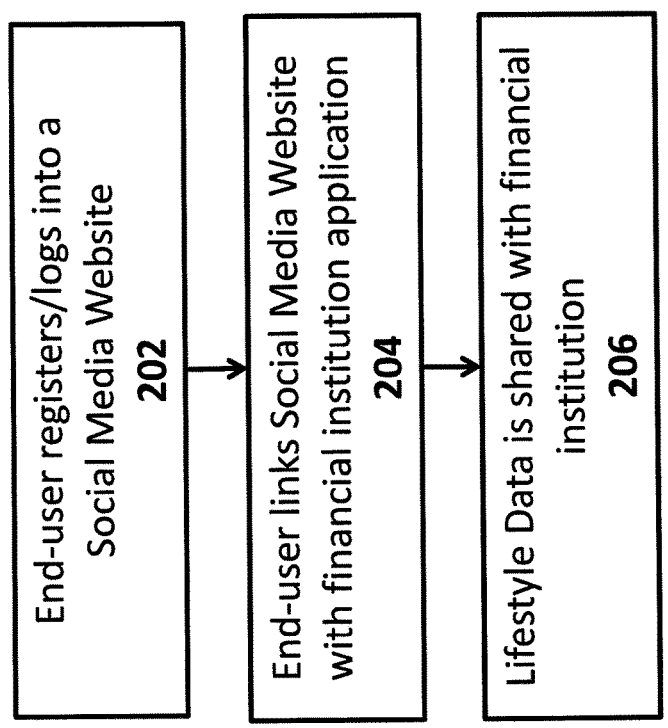
FIG. 2 is a flowchart diagram illustrating an example method of linking one or more financial accounts.

FIG. 2 is a flowchart diagram 200 illustrating an example method of linking one or more financial accounts (e.g., Credit Cards) with one or more third-party websites (e.g., Social Media Networks) to facilitate communication of user-data. While Credit Cards and Social Media Networks are used in this example, one of skill in the art would appreciate that it is possible to apply the underlying functions to other financial accounts and/or third-party websites. Therefore, the present disclosure should not be construed to be limited to Credit Cards and/or Social Media Networks.

At Step 202, the end-user may log into, or otherwise gain access to, a Social Media Network using the end-user's credentials (e.g., a username and password). If the end-user is not yet registered to use the Social Media Network, the end-user may be required to first create an account with the Social Media Network. Once the Social Media Network authenticates the end-user's credentials, the end-user may opt into participating in the Social Media Fraud Protection System 100, thereby linking the end-user's social media profile with that end-user's financial institutions at step 204. The end-user may link their profile on the Social Media Network with their financial institutions by, for example, installing an application on a user device (e.g., a portable computer or smartphone) or any other method of data linkage.

At Step 206, the end-user may designate the type of user-data from the end-user's profile that the end-user wishes to share with their financial institution. Designated user-data may include, but is not limited to, past Location, present Location, future Location, Merchants they Like, Merchant black lists (i.e., blocked Merchants), Merchant white lists (i.e., trusted Merchants), relationship status, and social event calendars. Social event calendar data could include information related to future information of what an end-user will be doing such as a business trip, vacation, birthday party, or even an anniversary dinner. Relationship status includes information whether a user is single, married, or engaged. For example, if a user is single and then becomes engaged, the Social Media Fraud Protection System 100 may be programmed to expect the end-user to shop at expensive flower shops, jewelry shops, etc. Once a financial account is linked with one or more third-party websites, the financial institution is permitted to use any designated user-data without restriction or further action by the user. Accordingly, the end-user need not repeat steps 202 through 204 unless the end-user wishes to change, or update, one or more settings, link additional third-party websites and/or financial accounts.

Figure 3:
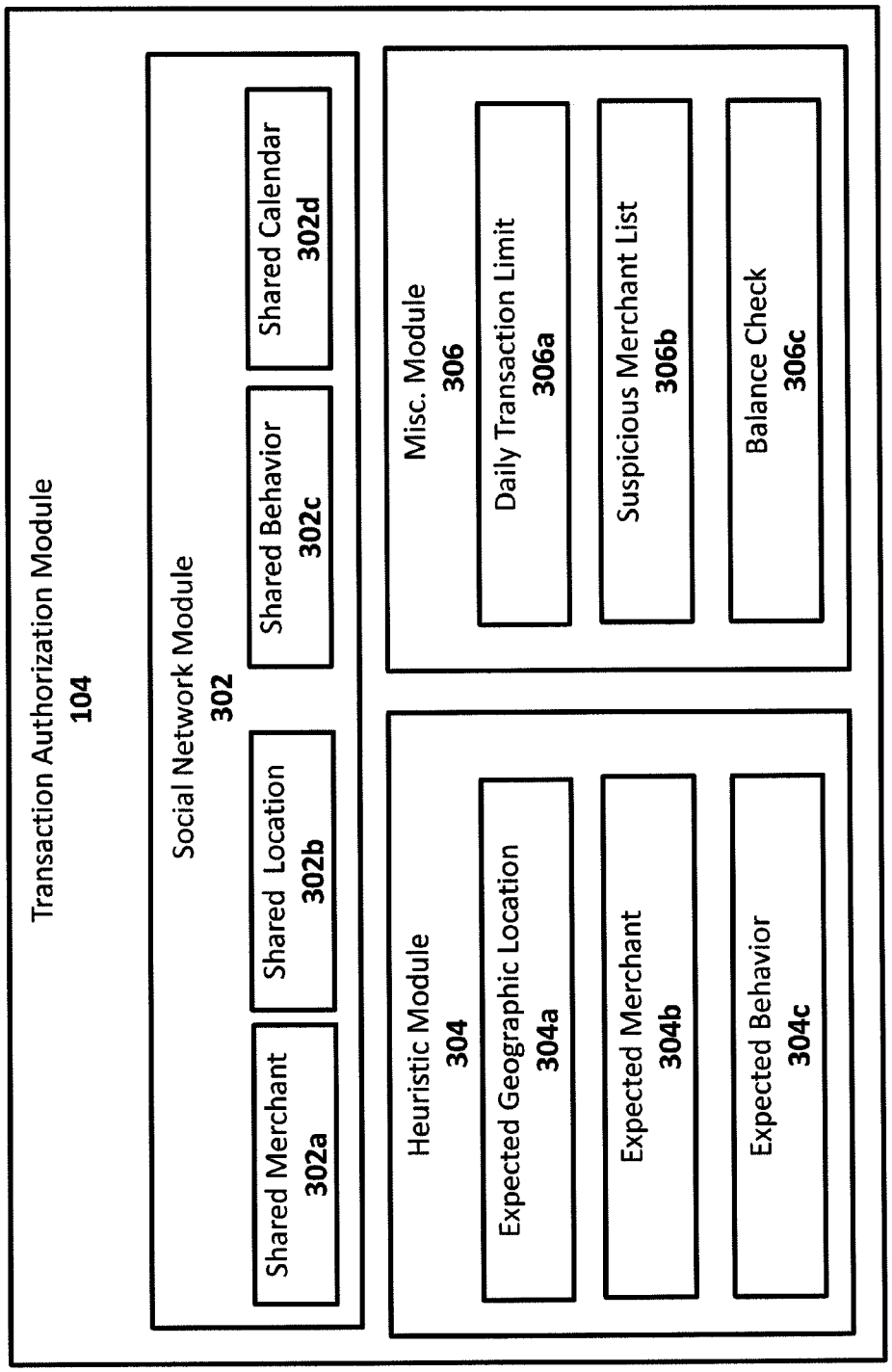
FIG. 3 is a block diagram illustrating an example architecture for a Transaction Authorization Module.

FIG. 3 is a block diagram illustrating an example architecture for a Transaction Authorization System 104 according to embodiments of the present invention. As illustrated, while transaction authorization systems may rely on Heuristic Module 304 and other Miscellaneous Module 306 to detect fraud, the Transaction Authorization System 104 preferably comprises a Social Network Module 302 to aid in fraud protection. By supplementing, or replacing, the Heuristic Module 304 with a Social Network Module 302, the computationally expensive and complex heuristics of modules 304a through 304c may be short-circuited. As a result, performance and reliability may be increased while expenses can be greatly reduced due to decreased hardware and electric power and data center costs (CPU/hour usage).

Through a Social Network Module 302, financial institutions can receive user-data from a Social Media Network. For example, the Social Network Module 302 may be configured to scan, or otherwise receive, data stored by a Social Media Network, including at least information provided through the end-user's news feed (e.g., recent posts, updates, Check-Ins, etc.). The user-data can provide, for example, the end-user's Shared Location Module 302b, which is generally the end-user's present Location, or, at minimum, a recent Location. The user-data may further provide information related to: (1) Shared Merchant Module 302a, such as Merchants that the end-user likes or otherwise trusts; (2) future Locations, which may be accomplished by looking at the end-user's calendar and may include events such as an anniversary dinner at an expensive restaurant; (3) past Locations, to help aid with transaction disputes; or (4) Shared Behavior Module 302c, which may include interests and events such as attending a soccer game so they will buy tickets, organizing a party so they will buy party supplies or eating at a fancy restaurant, or even joining a bowling league, which likely means the user will purchase bowling equipment as an example.

Accordingly, the Social Network Module 302 obviates the need to guess what a user is doing and eliminates the need for expensive hardware and computationally complex heuristic algorithms. Social media fraud protection system modules may include, for example, Shared Merchant Module 302a, Shared Location Module 302b, Shared Behavior Module 302c and Shared Calendar Module 302d, which are explained in greater detail in FIGS. 4, 5, 6, and 7 respectively.

Indeed, an end-user can identify Merchants that the end-user trusts or does not trust through a Social Media Network. For example, Merchants that the end-user Likes via the end-user's Social Media Network profile may be added to a "white list," indicating that the Merchant is not likely fraudulent. Similarly, Merchants that the end-user Dislikes may be added to a "black list," indicating that the Merchant is likely fraudulent. Thereby enabling a financial institution to effectively identify potentially fraudulent transactions. Thus, the user-data may comprise data relating to one or more Merchant names. The one or more Merchant names may be flagged as approved (white list) or blocked (black list). Accordingly, a financial transaction may be authorized if a Merchant name is flagged as approved and denied if the Merchant name is flagged as blocked.

To the extent that user-data is unavailable to the Social Network Module 302, or otherwise insufficient, Heuristic Module 304 may be used to identify fraudulent transactions based on existing heuristics algorithms used by financial transaction providers, hence providing a backstop for fraud detection if the Social Network Module 302 does not allow for a short-circuit of modules 304 and 306. Accordingly, the processes illustrated in FIGS. 4 through 7 may be employed once the one or more financial accounts are linked with one or more third-party data sources to facilitate communication of user-data.

Figure 4:
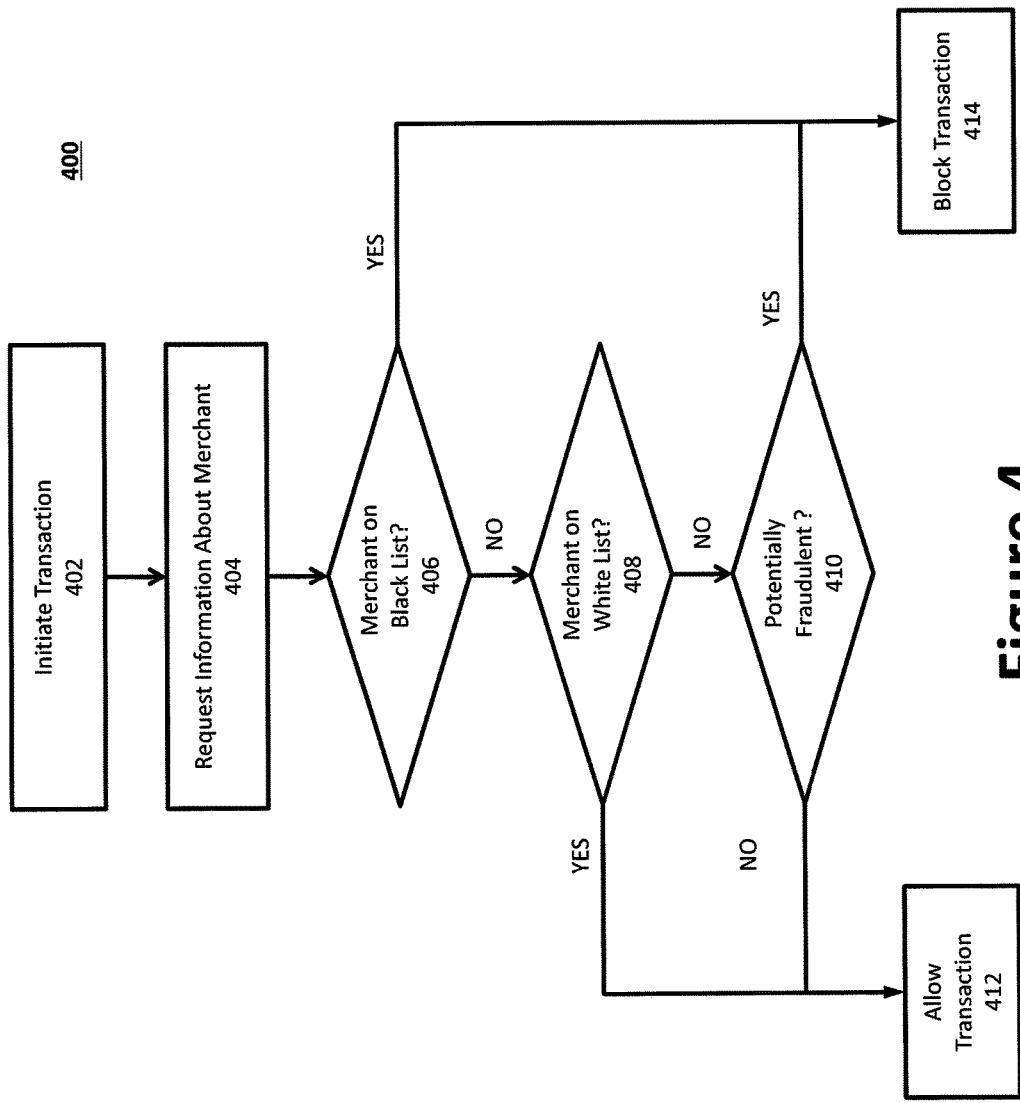
FIG. 4 is flow chart of an example Shared Merchant Module process.

FIG. 4 illustrates an example flowchart 400 of a fraud protection method that uses user-data from a Social Media Network to determine and authorize/deny transactions based on the end-user's preferred Merchants. The preferred merchants may be used to generate black and/or white lists. As illustrated, an end-user may initiate a transaction with a Merchant at step 402. The Shared Merchant Module 302a receives the transaction request from the Merchant, which contains transaction-data, such as Merchant Location, merchant name, type of goods, transaction amount, end-user account information and end-user name among other things. At step 404, the Shared Merchant Module 302a may query the end-user's Social Media Network profile for any information associated with the Merchant. At step 406, the Shared Merchant Module 302a determines whether the Merchant is listed on the end-user's black list. If the Merchant is listed on the black list, the transaction is blocked at step 414.

If the Merchant is not on the black list, the Shared Merchant Module 302a proceeds to the next step. At step 408, the Shared Merchant Module 302a determines whether the Merchant is listed on the end-user's white list. If the Merchant is listed on the white list, the transaction is allowed at step 412. If the Merchant is not on the white list, the Shared Merchant Module 302a proceeds to the next step. At step 410, the Shared Merchant Module 302a determines whether the transaction is potentially fraudulent based on other data. For example, other modules within the Social Network Module 302 may be employed, such as the Shared Location Module 302b, Shared Behavior Module 302c and Shared Calendar Module 302d. Alternatively, if the Social Network Module 302 is unable to provide sufficient data for a particular transition, the Heuristics Module 304 or Miscellaneous Module 306 may be employed to determine whether the transaction is potentially fraudulent. If the transaction is flagged as potentially fraudulent, the transaction is blocked at step 414. If the transaction is not flagged as potentially fraudulent, the transaction is allowed at step 412.

For example, if an end-user Likes the Merchant "Louis Vuitton" on the end-user's Social Media Network, Louis Vuitton may be added to the white list and the financial institution need not flag a transaction at Louis Vuitton as fraud. Conversely, if an end-user Dislikes the Merchant "Ducci" and is boycotting that Merchant via the end-user's Social Media Network, Ducci may be added to the black list and the financial institution may flag a transaction at Ducci as fraud.

Figure 5:
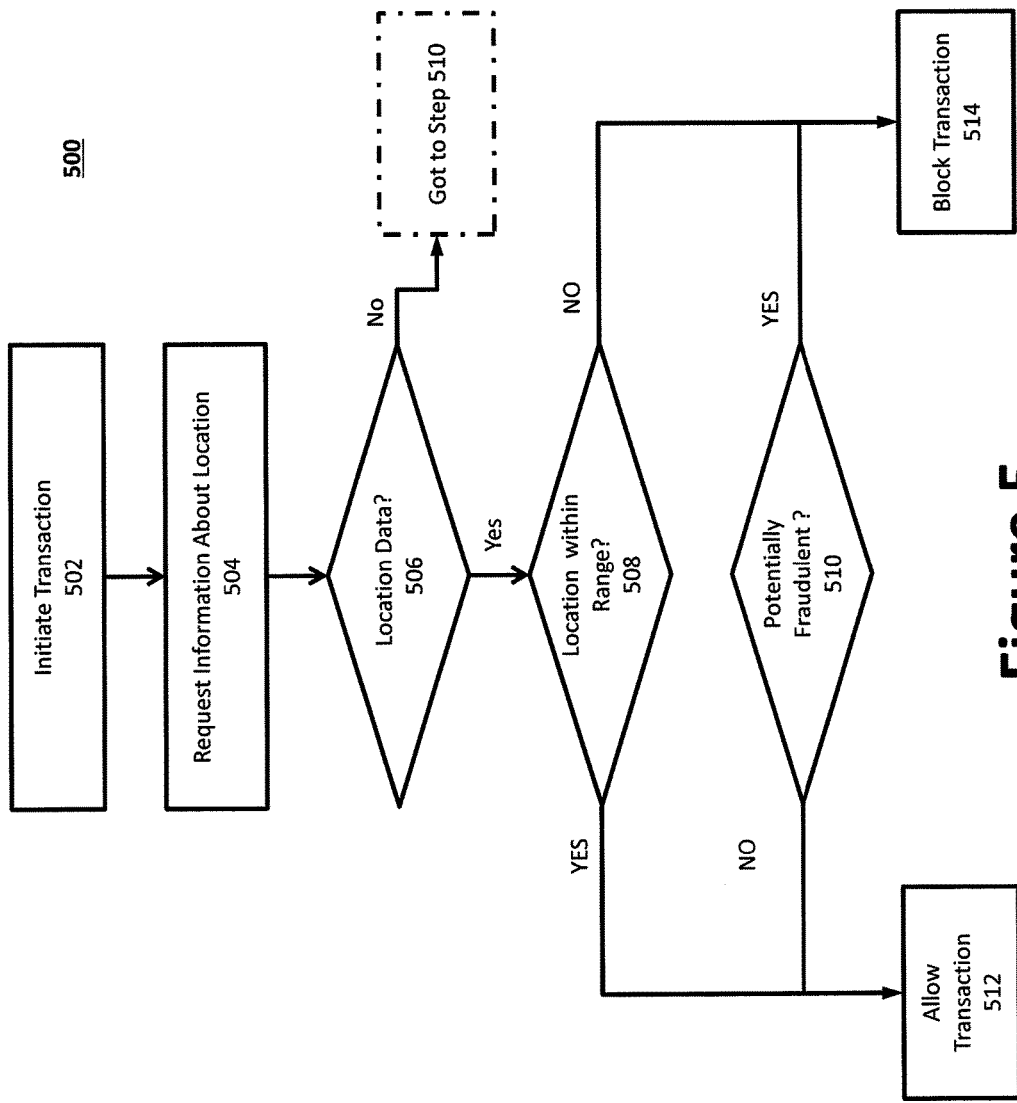
FIG. 5 is flow chart of an example Shared Location Module process.

FIG. 5 illustrates an example flowchart 500 of a fraud protection method that uses user-data from a Social Media Network to determine and authorize/deny transactions based on user-data representing the end-user's past, present or future Location. Thus, the user-data may comprise data relating to one or more Locations. The one or more Locations may be flagged as approved (white list) or blocked (black list) depending on the distance between the user-data Location and Merchant Location identified in, for example, the transaction-data. Accordingly, a financial transaction may be authorized if a Location is flagged as approved (e.g., within a predetermined distance of the Merchant Location) and denied if the Location is flagged as denied (e.g., outside of a predetermined distance of the Merchant Location). As illustrated, an end-user may initiate a transaction with a Merchant at step 502. The Shared Location Module 302b receives the transaction request from the Merchant, which contains transaction-data, such as Merchant Location, Merchant name, type of goods, transaction amount, end-user account information and end-user name among other things.

At step 504, the Shared Location Module 302b may query the end-user's Social Media Network profile for any information associated with the end-user's Location (e.g., present Location or recent Location where the Location could be in the future or past based on a scheduled event). At step 506, the Shared Location Module 302b determines whether the Location data exists for the end-user. Location data may be created in a number of ways. For example, when a user Checks-In to a venue using a Social Media Network, Location data associated with the Check-In may be gathered as related with the user as a present or past Location. In certain situations, as discussed below, future Locations may also be identified or anticipated using calendar data, wall posts, statuses, etc.

Generally speaking, the Location data may be determined using, for example, (i) known longitudinal/latitudinal coordinates for the particular venue/Merchant, (ii) GPS coordinates using a GPS receiver, and/or (iii) an input from the user. For example, when a user Checks-In at the Olive Garden, the Social Media Network may query a look-up table to determine the Location of the Olive Garden. In another alternative, a portable device's internal GPS receiver (or other triangulation method) may provide the end-user's GPS coordinate at the time of Check-In. In yet another alternative, the end-user may be prompted, or otherwise solicited, to provide the Location. In fact, the Social Media Network may employ multiple methods. For example, the end-user may indicate that he or she is at the Olive Garden. If there are multiple Olive Gardens, the Social Media Network may provide multiple options for specific Olive Gardens or query the end-user for the Location.

Alternatively, the Social Media Network may use a look-up table to identify the exact addresses for the multiple Olive Gardens. The addresses may be coupled with GPS coordinates, which may be used to automatically identify the closest Olive Garden to the end-user's present GPS coordinate (e.g., using a mobile device's GPS transceiver), thereby further increasing accuracy. In certain aspects, Location may be determined using a third-party person Check-In. For example, if a friend Checks-In the end-user as being at a particular Location, that Location may be used as the end-user's Location, even though he or she did not personally Check-In. Accordingly, the end-user may provide a list of "trusted" friends to ensure that all Check-Ins may be used by a bank as a trusted source.

The Location, or data representing a Location, may further include time-stamp information indicating when a user was at said Location. Accordingly, a fraud protection system may refer to the time-stamp information to determine the reliability of Location data. Moreover, the fraud protection system may be configured to only trust (e.g., consider) Location data having a time-stamp within a predetermined period of time. Thus, in certain aspects, it may be possible for the Location to expire (e.g., no longer trusted) after a configurable amount of time. Similarly, Location data time-stamps may be further used to identify fraud. For example, if the fraud protection system determines that the end-user is in Chicago, Ill., at 1 pm CST, and then makes a purchase in Berlin, Germany, at 2 pm CST, the fraud protection system may conclude that it would not be possible to travel that distance in one hour, thereby denying the transaction. Such time/place correlation methodology may also be employed to verify the accuracy of received Location data. For example, if the end-user resides in Chicago, Ill., makes a purchase in Chicago Ill., but "Checks-In" one hour later in London (e.g., via a Social Media Network), the fraud protection system may be configured to distrust Location data retrieved from that data source until, for example, the user re-confirms the accuracy of the source, thereby indicating that the account has not been hacked.

If Location data for the end-user exists, the Shared Location Module 302b proceeds to step 508. If Location data for the end-user does not exist, the Shared Location Module 302b proceeds to step 510. At step 508, the Shared Location Module 302b determines whether the Location data for the end-user matches the transaction Location. The Shared Location Module 302b need not require exact matches. Accordingly, the Shared Location Module 302b may determine whether the transaction Location is within a predetermined distance of the Location data for the end-user. The predetermined distance may be established when the end-user initially sets up of the Social Media Fraud Protection System 100 and may be updated or edited by the end-user or financial institution as needed. Thus, a financial institution may set the predetermined distance or may allow the end-user to set the predetermined distance. For example, when the end-user opens an account, the financial institution may query the end-user for a preferred predetermined distance. A similar method may be applied to virtual Locations. For example, when a user signs in to Amazon®, the end-user may share that they are shopping on Amazon® a Social Media Network. A financial institution may then confirm with user-data received from the Social Media Network that the Merchants are a match.

In operation, the Shared Location Module 302b may find a match when the two Locations are within the same city, state, country, or within a predetermined distance of each other (e.g., in miles). If the transaction Location is within a predetermined distance of the Location data for the end-user, the transaction is allowed at step 512. If the transaction Location is not within a predetermined distance of the Location data for the end-user, the transaction is blocked at step 514. For example, if an end-user travels from Chicago to Rome on vacation, an end-user may pre-authorize and transactions that occur in the Rome, or even Italy. Another example could be that a user Checks-In to a Merchant such as a restaurant and the transaction provider just needs to check for the name of the Merchant and vendor to match. It may be reasonable to set distance tolerance levels such that any transaction within an X-mile radius from the Location provided by the user via the Social Media Network would also be allowed. The end-user Location may also be provided with configurable timeout. In other words, the Location is trusted for a predetermined number of hours (e.g., 12-24 hours) before it is no longer valid as a point of authentication.

At step 510, the Shared Location Module 302b determines whether the transaction is potentially fraudulent based on other data. For example, other modules within the Social Network Module 302 may be employed, such as the Share Merchant Module 302a, Shared Behavior Module 302c and Shared Calendar Module 302d. Alternatively, if the Social Network Module 302 is unable to provide sufficient data for a particular transition, the Heuristics Module 304 or Miscellaneous Module 306 may be employed to determine whether the transaction is potentially fraudulent. If the transaction is flagged as potentially fraudulent, the transaction is blocked at step 514. If the transaction is not flagged as potentially fraudulent, the transaction is allowed at step 512.

Figure 6:
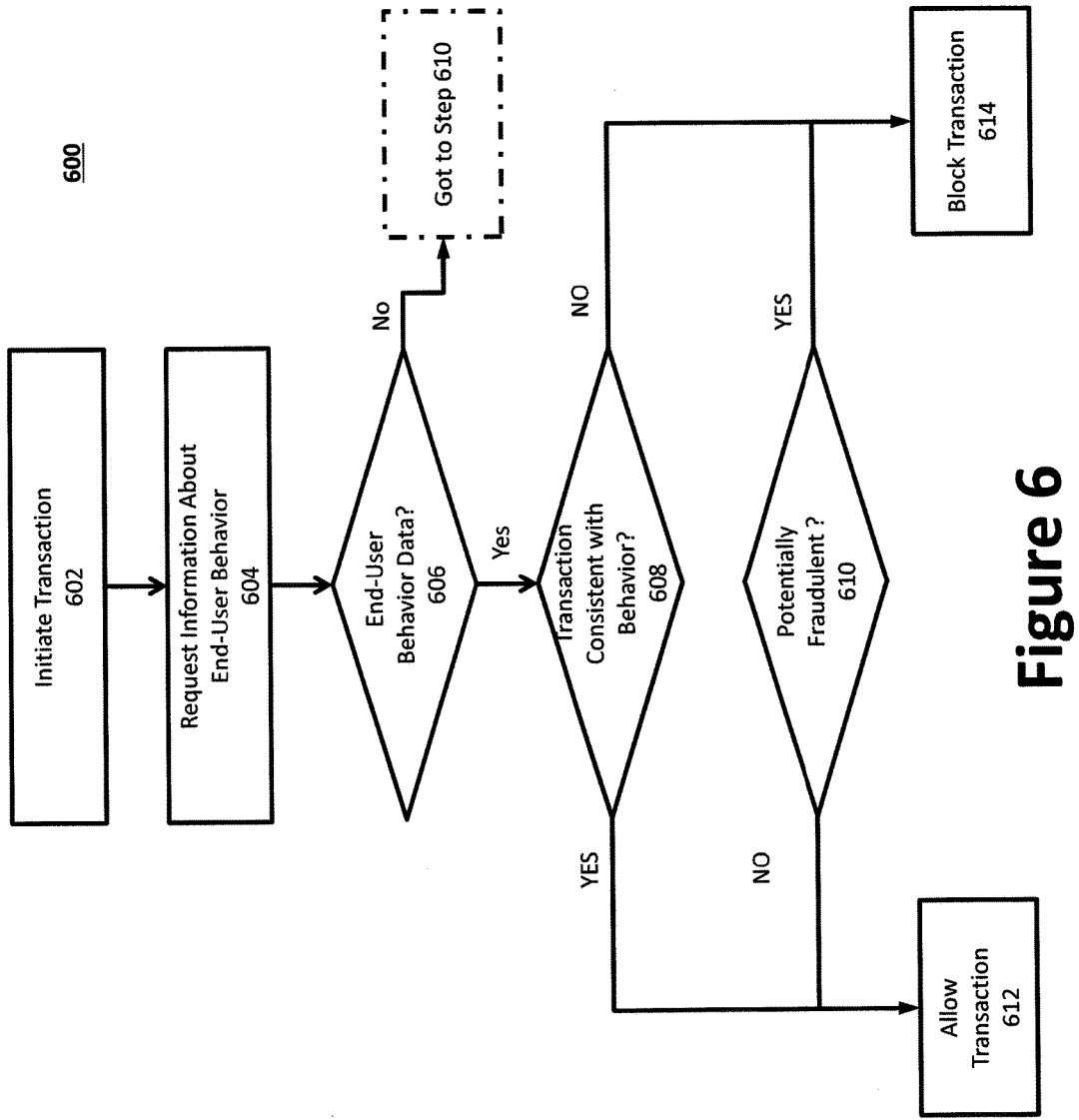
FIG. 6 is flow chart of an example Shared Behavior Module process.

FIG. 6 illustrates an example flowchart 600 of a fraud protection method that uses user-data from a Social Media Network to determine and authorize/deny transactions based on the end-user's behavior data. Behavior data may include data related to, for example, affinity for sports, fine dining, or drinking. Indeed, behavior data may include forbidden spending categories, such an aversion to alcohol, strip clubs, etc. Accordingly, behavior data may be used to determine whether a transaction is consistent with the end-user's lifestyle by flagging transactions as fraudulent when they relate to forbidden spending categories and/or allowing transactions to which the users have expressed an affinity. Thus, the user-data may comprise data relating to one or more behavior categories. The one or more behavior categories may be flagged as approved (white list) or blocked (black list). Accordingly, a financial transaction may be authorized if a behavior category is flagged as approved and denied if the behavior category is flagged as blocked.

As illustrated, an end-user may initiate a transaction with a Merchant at step 602. The Shared Behavior Module 302c receives the transaction request from the Merchant, which contains transaction-data, such as Merchant Location, merchant name, type of goods, transaction amount, end-user account information and end-user name among other things.

At step 604, the Shared Behavior Module 302c may query the end-user's Social Media Network profile for any information associated with the end-user's interests and behavior (e.g., interest in skiing, fine dining, soccer, etc.). At step 606, the Shared Behavior Module 302c determines whether the behavior data exists for the end-user. If behavior data for the end-user exists, the Shared Behavior Module 302c proceeds to step 608. If behavior data for the end-user does not exist, the Shared Behavior Module 302c proceeds to step 610.

At step 608, the Shared Behavior Module 302c determines whether the behavior data for the end-user is consistent with the transaction. For example, if the transaction is for soccer equipment and the behavior data for the end-user indicates that the user plays soccer, the transaction may be approved. As with the other modules, the Shared Behavior Module 302c need not require exact matches. Accordingly, the Shared Behavior Module 302c may determine whether the transaction Location is in the same field or category. For example, any sports-related purchase may be authorized based on the end-user's interest in soccer. If the behavior data for the end-user is consistent with the transaction, the transaction is allowed at step 612. If the behavior data for the end-user is inconsistent with the transaction, the transaction is blocked at step 614.

At step 610, the Shared Behavior Module 302c determines whether the transaction is potentially fraudulent based on other data. For example, other modules within the Social Network Module 302 may be employed, such as the Shared Merchant Module 302a, Shared Location Module 302c and Shared Calendar Module 302d. Alternatively, if the Social Network Module 302 is unable to provide sufficient data for a particular transition, the Heuristics Module 304 or Miscellaneous Module 306 may be employed to determine whether the transaction is potentially fraudulent. If the transaction is flagged as potentially fraudulent, the transaction is blocked at step 614. If the transaction is not flagged as potentially fraudulent, the transaction is allowed at step 612. For example, if the end-user shares behavior data indicating that the end-user has joined a bowling or softball league, the Shared Behavior Module 302c can anticipate that the end-user will spend an amount of money at, for example, a sporting goods Merchant in the near future. Shared behavior may be configured by the financial institution, or end-user, to set allowed behaviors like a camping trip as valid reasons to spend unusual amounts of money.

Figure 7:
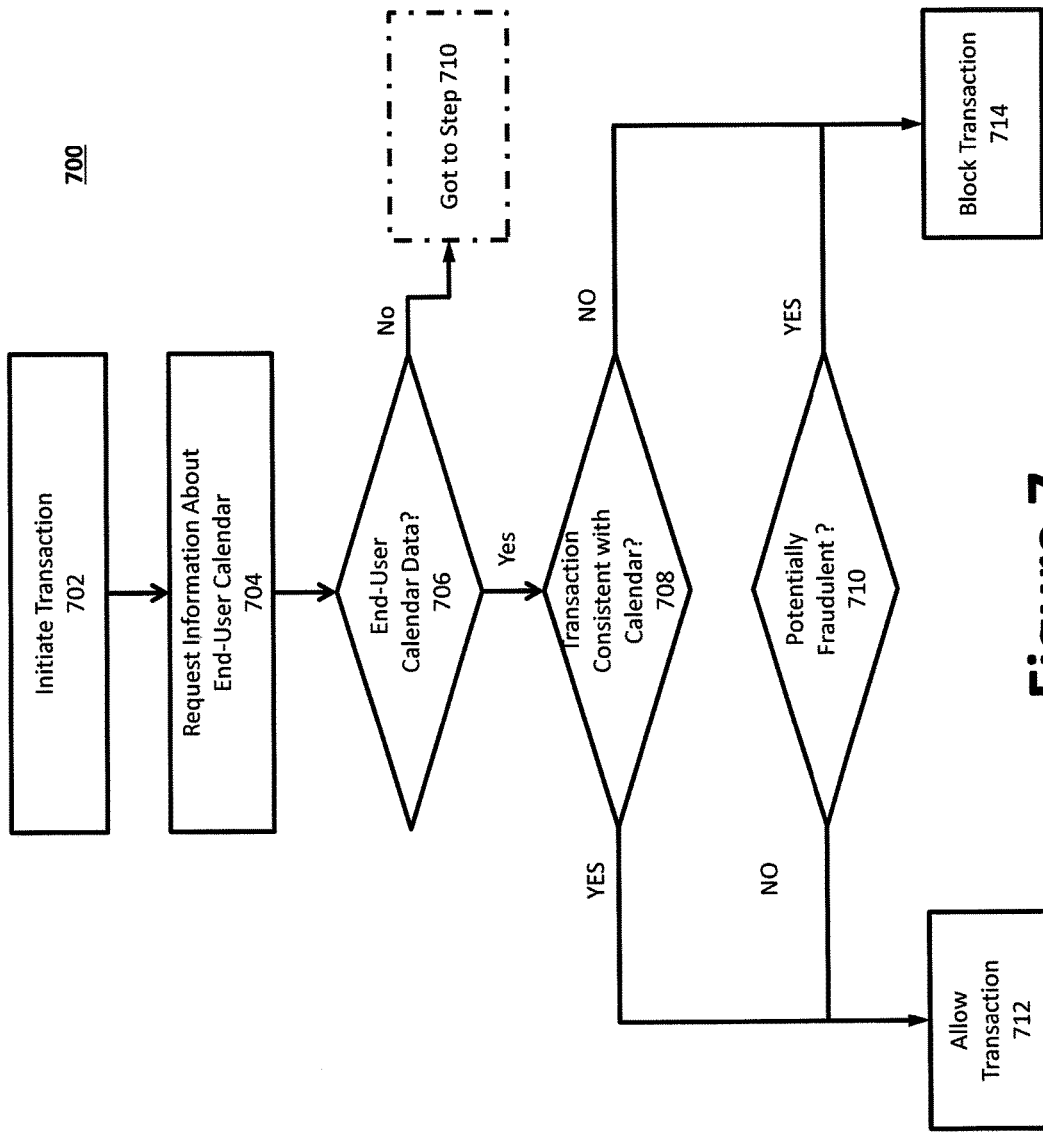
FIG. 7 is flow chart of an example Shared Calendar Module process.

FIG. 7 illustrates an example flowchart 700 of a fraud protection method that uses user-data from a Social Media Network to determine and authorize/deny transactions based on the end-user's calendar data. Calendar data may include data related to, for example, upcoming trips, vacations, meetings, concerts, dining, Location, or parties. As illustrated, an end-user may initiate a transaction with a Merchant at step 702. The Shared Calendar Module 302d receives the transaction request from the Merchant, which contains transaction-data, such as Merchant Location, merchant name, type of goods, transaction amount, end-user account information, and end-user name among other things.

At step 704, the Shared Calendar Module 302d may query the end-user's Social Media Network profile or other calendar (e.g., Microsoft Outlook®) for any information associated with the end-user's upcoming events. At step 706, the Shared Calendar Module 302d determines whether the calendar data exists for the end-user. If calendar data for the end-user exists, the Shared Calendar Module 302d proceeds to step 708. If calendar data for the end-user does not exist, the Shared Calendar Module 302d proceeds to step 710.

At step 708, the Shared Calendar Module 302d determines whether the calendar data for the end-user is consistent with the transaction. For example, if the transaction is for wedding supplies and the calendar data for the end-user indicates that he is planning to get married in the near future, the transaction may be approved. As with the other modules, the Shared Calendar Module 302d need not require exact matches. Accordingly, the Shared Calendar Module 302d may determine whether the transaction Location is in the same field or category. For example, any flower/venue rental-related purchase may be authorized based on the end-user's upcoming wedding. If the calendar data for the end-user is consistent with the transaction, the transaction is allowed at step 712. If the calendar data for the end-user is inconsistent with the transaction, the transaction is blocked at step 714.

At step 710, the Shared Calendar Module 302d determines whether the transaction is potentially fraudulent based on other data. For example, other modules within the Social Network Module 302 may be employed, such as the Shared Merchant Module 302a, Shared Location Module 302b and Shared Behavior Module 302c. Alternatively, if the Social Network Module 302 is unable to provide sufficient data for a particular transaction, the Heuristics Module 304 or Miscellaneous Module 306 may be employed to determine whether the transaction is potentially fraudulent. If the transaction is flagged as potentially fraudulent, the transaction is blocked at step 714. If the transaction is not flagged as potentially fraudulent, the transaction is allowed at step 712. For example, if the end-user shares calendar data indicating that the user is planning a trip to Las Vegas, the Shared Behavior Module 302c can anticipate that the end-user will spend money in Las Vegas on, for example, hotels, gambling and/or fine dining. Shared Calendar Module 302d may be configured by the financial institution, or end-user, to set allowed expenses related to upcoming calendar events.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications and variations will be ascertainable to those of skill in the art. Thus, it is to be understood that the invention may therefore be practiced otherwise than as specifically described above.

What is claimed is:

1. A transaction authentication system for managing financial transactions, said transaction authentication system comprising:
    a non-transitory data storage device, the non-transitory data storage device having a database linking a financial account data at a financial institution, wherein said financial account data is associated with an end-user and with a computerized social media account login information data,
    wherein said data storage device receives, from a transaction application installed on a smartphone associated with said end-user, said computerized social media account login information data for a computerized social media account associated with said end-user; and
    a computer operatively coupled to (i) the non-transitory data storage device, and (ii) said smartphone associated with the end-user, the smartphone having a transceiver to determine a real-time location of the smartphone wherein said computer is configured to:
    receive transaction-data associated with a financial transaction from a point-of-sale system over a communication network, wherein said transaction-data includes merchant point-of-sale system location data and transaction financial account data;
    receive, by using said transaction financial account data to identify related computerized social media account login information data to be employed to electronically query a social media account, user-data at the computer from the computerized social media account over the communication network, wherein said user-data comprises the most recent location of the smartphone;

analyze the financial transaction by comparing the received transaction-data to the received user-data;
generate an electronic authorization flag when said merchant point-of-sale system location data represents a location less than a stored predetermined distance from said most recent location of the smartphone;
transmit the authorization flag over the communication network to the financial institution,
wherein said financial institution does not complete said financial transaction unless said authorization flag is received.

2. A social-media-based financial transaction authorization system including:
a software application installed on a user smartphone, wherein said software application includes user financial account data,
wherein, when a user logs into a computerized social media account using said smartphone, said software application receives social media account login information data for said computerized social media account and transmits said social media account login information data and said user financial account data to a computerized transaction authorization system, wherein said social media account login information data and said user financial account data are electronically associated at said computerized transaction authorization system; and
a computerized transaction authorization system receiving electronic transaction data from a merchant point-of-sale system,
wherein said electronic transaction data represents a financial transaction for which authorization is sought,
wherein said transaction data includes at least merchant point-of-sale system location data and transaction financial account data;
wherein said computerized transaction authorization system uses said transaction financial account data to identify related social media account login information data stored at said computerized transaction authorization system,
wherein said computerized transaction authorization system uses said social media account login information data to electronically query said computerized social media account to determine social media user location data most recently received by said computerized social media account,
wherein said computerized transaction authorization system determines a transaction distance between the location represented by said merchant point-of-sale system location data and the location represented by said social media user location data,
wherein said computerized transaction authorization system retrieves predetermined distance data representing a predetermined maximum distance from the location represented by said merchant point-of-sale system location data,
wherein, when said transaction distance is less than said predetermined maximum distance, said computerized transaction authorization system transmits an electronic authorization to a financial institution computer system,
wherein receipt of said electronic authorization by said financial institution is required to allow the financial transaction represented by said electronic transaction data to proceed.

* * * * *